Dec. 8, 1925.                E. STABBERT                1,565,117
                                FEEDER
                          Filed Nov. 11, 1924          2 Sheets-Sheet 1
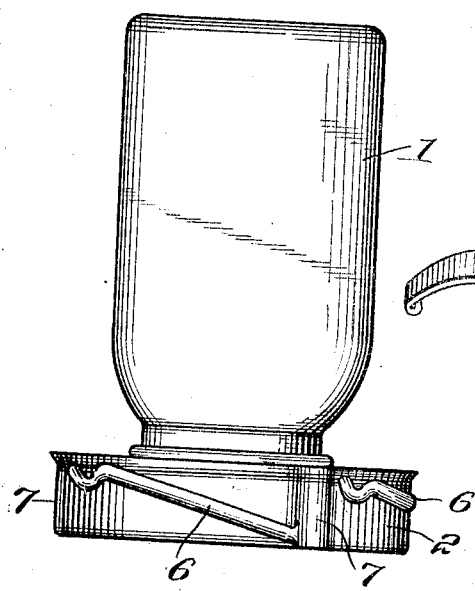
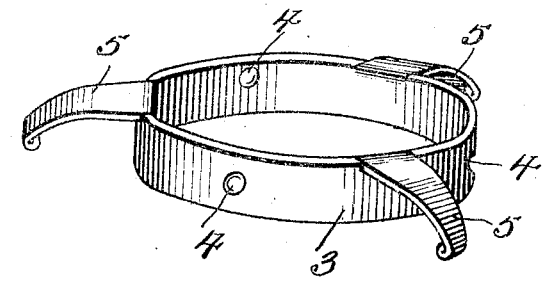
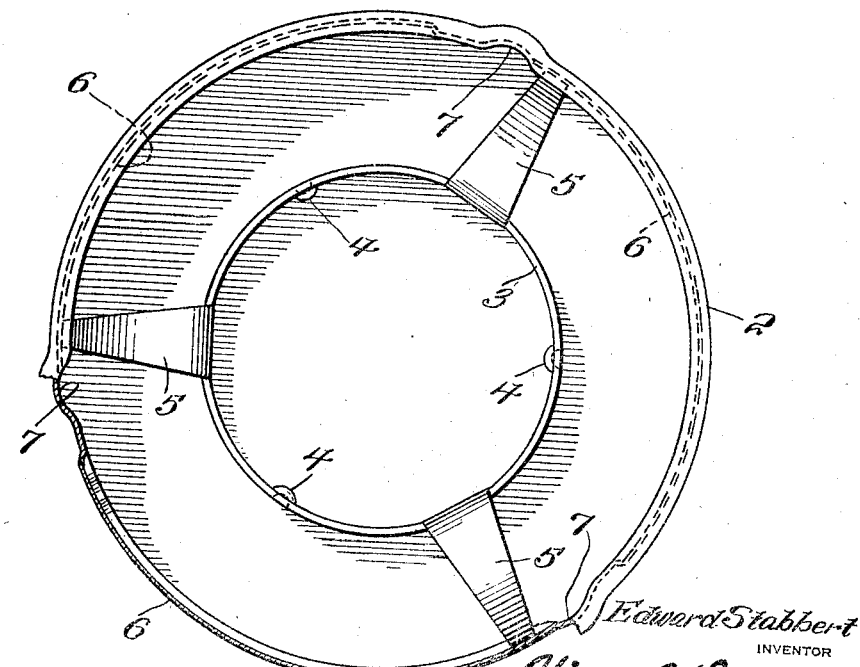
Edward Stabbert
INVENTOR
BY Victor J. Evans
ATTORNEY
WITNESS: J. L. Wright

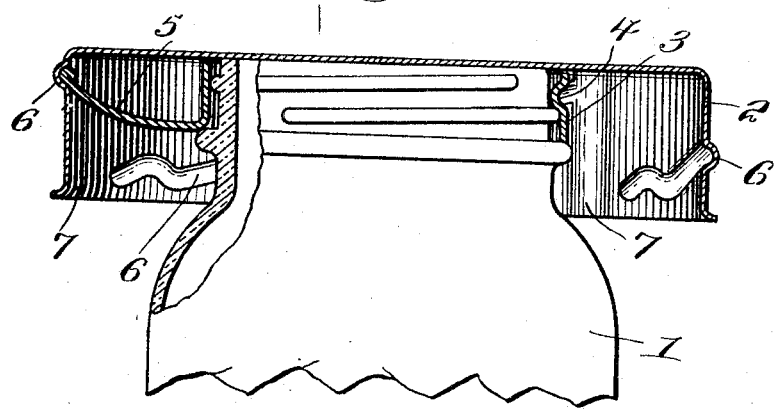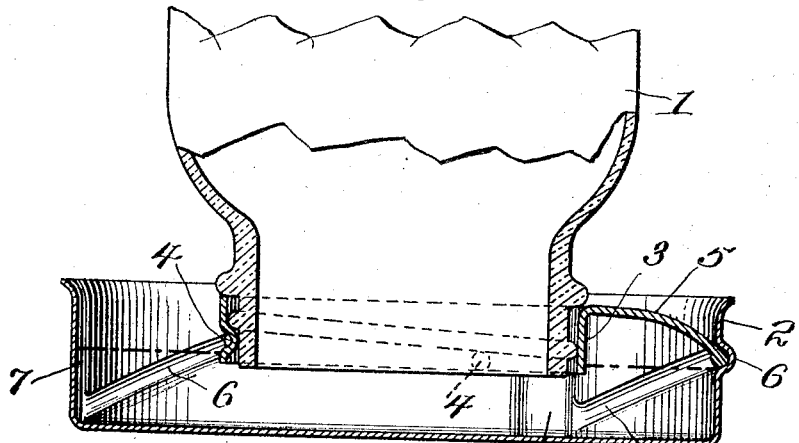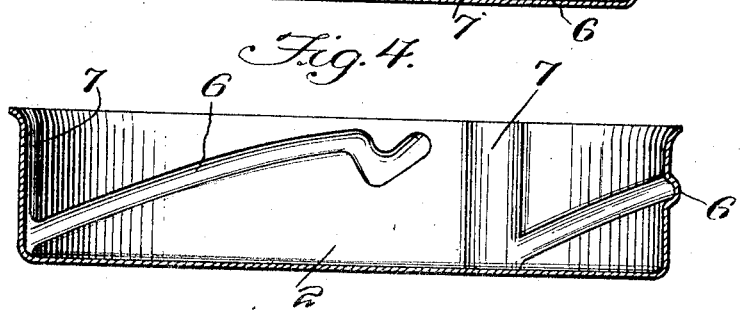

Patented Dec. 8, 1925.

1,565,117

UNITED STATES PATENT OFFICE.

EDWARD STABBERT, OF TACOMA, WASHINGTON.

FEEDER.

Application filed November 11, 1924. Serial No. 749,263.

*To all whom it may concern:*

Be it known that I, EDWARD STABBERT, a citizen of the United States, residing at Tacoma, in the county of Pierce and State of Washington, have invented new and useful Improvements in Feeders, of which the following is a specification.

This invention relates to an automatic feeder, the general object of the invention being to provide means for regulating the space between the mouth of the receptacle and the bottom of the pan so as to make the device usable for liquids of various kinds.

Another object of the invention is to provide means for preventing the wasting of the liquid when the device is turned upside down after filling the receptacle.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view of the invention.

Figure 2 is a longitudinal sectional view with the receptacle in upright position.

Figure 3 is a similar view with the parts in operative position and with the collar raised to space the mouth of the receptacle from the bottom of the pan.

Figure 4 is a sectional view through the pan.

Figure 5 is a plan view of the pan with the collar therein.

Figure 6 is a view of the collar.

In these views 1 indicates the receptacle which may be of any desired form though it is shown as a glass jar. The pan as shown at 2 and 3 indicates a collar which is provided with the projections 4 for engaging the threads on the jar and with the arms 5 which have their small ends adapted to engage the spiral grooves 6 which are formed in the inner walls of the pan, so that the collar can be adjusted vertically in the pan by turning it to cause the ends of its arms to engage different parts of the grooves. I provide recesses 7 in the walls of the pan for facilitating the entrance of the arms into the grooves.

From the above it will be seen that by placing the collar in engagement with the bottom of the pan and then placing the collar over the neck of the jar or receptacle, while the same is in operative position, the collar will act to prevent escape of the liquid from the jar when the device is being reversed. After the device is placed in reversed position it is simply necessary to give the collar a partial turn, to space it and the mouth of the jar, from the bottom of the pan so as to permit some of the liquid in the jar to escape into the pan. By adjusting the collar in the pan any desired level of liquid in the pan can be maintained. This arrangement of parts makes the device capable of being used for liquids of various kinds as it permits the receptacle to be adjusted so as to make easy flow of heavy liquids which ordinarily require shaking of the jar to make them flow into the pan.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. An automatic feeder comprising a receptacle and a pan, means for holding the mouth of the receptacle at any desired distance from the bottom of the pan, such means consisting of a collar attached to the receptacle and means for adjustably connecting said collar with the pan, such means consisting of arms carried by the collar and engaging spiral grooves in the walls of the pan.

2. A device of the class described comprising a receptacle, a pan, a collar connected with the mouth of the receptacle and means for adjustably supporting the collar in the pan so that it may be placed in engagement with the bottom of the pan to prevent escape of the liquid in the jar or be spaced from said bottom to permit the liquid to flow from the receptacle.

In testimony whereof I affix my signature.

EDWARD STABBERT.